United States Patent
Alvi et al.

(10) Patent No.: US 11,984,834 B2
(45) Date of Patent: May 14, 2024

(54) POWER CONTROL SYSTEM FOR SWITCHING BATTERY CONFIGURATION DURING DRIVING

(71) Applicant: GM GLOBAL TECHNOLOGY OPERATIONS LLC, Detroit, MI (US)

(72) Inventors: Muhammad Hussain Alvi, Troy, MI (US); Chandra S. Namuduri, Troy, MI (US); Suresh Gopalakrishnan, Troy, MI (US); Chunhao J. Lee, Troy, MI (US); Lei Hao, Troy, MI (US); Yue-Yun Wang, Troy, MI (US); Rashmi Prasad, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 262 days.

(21) Appl. No.: 17/699,261

(22) Filed: Mar. 21, 2022

(65) Prior Publication Data

US 2023/0299695 A1 Sep. 21, 2023

(51) Int. Cl.
*H02J 7/00* (2006.01)
*H02P 5/74* (2006.01)
*H02P 23/14* (2006.01)

(52) U.S. Cl.
CPC .............. *H02P 5/74* (2013.01); *H02J 7/0013* (2013.01); *H02J 7/0063* (2013.01); *H02P 23/14* (2013.01)

(58) Field of Classification Search
CPC .. H02P 5/74; H02P 23/14; H02P 27/08; H02J 7/0013; H02J 7/0063
See application file for complete search history.

(56) References Cited

U.S. PATENT DOCUMENTS

2018/0294756 A1* 10/2018 Yoo ..................... B60L 15/2045
2021/0036643 A1    2/2021 Wang et al.

* cited by examiner

*Primary Examiner* — Muhammad S Islam (57) ABSTRACT

A power control system comprises a battery system including N battery packs. A plurality of contactors selectively connects N battery packs of a battery system in a first configuration supplying a first voltage level, a second configuration supplying a second voltage level, and a disconnected configuration. M power inverters connect the battery system to M electric machines, respectively. A controller is configured to determine when to transition between the first configuration and the second configuration. The controller is configured to transition between the first configuration and the second configuration by causing one of a positive torque transient and a negative torque transient to be generated by at least one of the M electric machines, transitioning the battery system from one of the first configuration and the second configuration to the disconnected configuration, and transitioning from the disconnected configuration to the other one of the first configuration and the second configuration.

20 Claims, 9 Drawing Sheets

POWER CONTROL SYSTEM FOR SWITCHING BATTERY CONFIGURATION DURING DRIVING

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to electric vehicles, and more particularly to power control systems for switching battery configuration during driving.

Electric vehicles (EVs) such as battery electric vehicles (BEVs), hybrid vehicles, and/or fuel cell vehicles include one or more electric machines and a battery system. The battery system includes one or more battery cells, modules and/or packs that are connected in series and/or parallel. A power control system is used to control charging and/or discharging of the battery system during charging and/or driving. During use, the electric machine is operated as a motor for propulsion and as a generator for regeneration during braking. The power control system includes a power inverter module that is arranged between the battery system and the electric machine.

SUMMARY

A power control system comprises a battery system including N battery packs, where N is an integer greater than one. A plurality of contactors selectively connects N battery packs of a battery system in a first configuration supplying a first voltage level, a second configuration supplying a second voltage level, and a disconnected configuration. M power inverters connect the battery system to M electric machines, respectively, where M is an integer greater than zero. A controller is configured to determine when to transition between the first configuration and the second configuration. The controller is configured to transition between the first configuration and the second configuration by causing one of a positive torque transient and a negative torque transient to be generated by at least one of the M electric machines, transitioning the battery system from one of the first configuration and the second configuration to the disconnected configuration, and transitioning from the disconnected configuration to the other one of the first configuration and the second configuration.

In other features, the N battery packs are connected in parallel in the first configuration. The N battery packs are connected in series in the second configuration. The plurality of contactors comprises a first contactor including a first terminal connected to a positive terminal of the battery system and a second terminal connected to a positive terminal of a second one of the N battery packs; a second contactor including a first terminal connected to the positive terminal of the second one of the N battery packs and a second terminal connected to a negative terminal of a first one of the N battery packs; and a third contactor including a first terminal connected to the negative terminal of the first one of the N battery packs and a second terminal connected to a negative terminal of the battery system.

In other features, the first contactor and the third contactor are closed and the second contactor is open when the battery system is in the first configuration. The first contactor and the third contactor are open and the second contactor is closed when the battery system is in the second configuration.

In other features, when transitioning from the first configuration to the second configuration when operating in a motoring configuration above a predetermined speed threshold, the controller is configured to cause the negative torque transient to be generated by at least one of the M electric machines. When transitioning from the second configuration to the first configuration when operating in a regeneration configuration below a predetermined speed threshold, the controller is configured to cause the positive torque transient to be generated by at least one of the M electric machines.

In other features, the controller determines when to transition between the first configuration and the second configuration in response to torque and speed of at least one of the M electric machines. The controller uses hysteresis when determining when to transition between the first configuration and the second configuration.

In other features, when transitioning from the first configuration to the second configuration when operating one of the M electric machines in a motoring configuration above a predetermined speed threshold, the controller is configured to cause the negative torque transient to be generated at least partially by another one of the M electric machines. When transitioning from the second configuration to the first configuration when operating one of the M electric machines in a regeneration configuration below a predetermined speed threshold, the controller is configured to cause the positive torque transient to be generated by another one of the M electric machines.

A method for controlling power delivery in an electric vehicle comprises providing a battery system including N battery packs, where N is an integer greater than one; selectively connecting N battery packs of a battery system in a first configuration supplying a first voltage level, a second configuration supplying a second voltage level, and a disconnected configuration using a plurality of contactors; connecting the battery system to M electric machines using M power inverters, respectively, where M is an integer greater than zero. The method includes determining when to transition between the first configuration and the second configuration. The method includes transitioning between the first configuration and the second configuration by: causing one of a positive torque transient and a negative torque transient to be generated by at least one of the M electric machines; transitioning the battery system from one of the first configuration and the second configuration to the disconnected configuration; and transitioning from the disconnected configuration to the other one of the first configuration and the second configuration.

In other features, the method includes connecting the N battery packs in parallel in the first configuration and connecting the N battery packs in series in the second configuration. In other features, the plurality of contactors comprises a first contactor including a first terminal connected to a positive terminal of the battery system and a second terminal connected to a positive terminal of a second one of the N battery packs; a second contactor including a first terminal connected to the positive terminal of the second one of the N battery packs and a second terminal connected to a negative terminal of a first one of the N battery packs; and a third contactor including a first terminal connected to the negative terminal of the first one of the N battery packs and a second terminal connected to a negative terminal of the battery system.

In other features, the method includes closing the first contactor and the third contactor and opening the second contactor when the battery system is in the first configuration; and opening the first contactor and the third contactor and closing the second contactor when the battery system is in the second configuration.

In other features, the method includes causing the negative torque transient to be generated by at least one of the M electric machines when transitioning from the first configuration to the second configuration when operating in a motoring configuration above a predetermined speed threshold. The method includes causing the positive torque transient to be generated by at least one of the M electric machines when transitioning from the second configuration to the first configuration when operating in a regeneration configuration below a predetermined speed threshold.

In other features, the method includes determining when to transition between the first configuration and the second configuration in response to torque and speed of at least one of the M electric machines. The method includes using hysteresis when determining when to transition between the first configuration and the second configuration. The method includes causing the negative torque transient to be generated at least partially by one of the M electric machines when transitioning from the first configuration to the second configuration when operating another one of the M electric machines in a motoring configuration above a predetermined speed threshold.

In other features, the method includes causing the positive torque transient to be generated by another one of the M electric machines when transitioning from the second configuration to the first configuration when operating one of the M electric machines in a regeneration configuration below a predetermined speed threshold.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Electric vehicles (EVs) such as battery electric vehicles (BEVs), hybrid vehicles, and/or fuel cell vehicles include one or more electric machines and a battery system. A power control system is used to control charging and/or discharging of the battery system. The power control system includes one or more power inverter modules that are arranged between the battery system and the one or more electric machines.

The battery system may include N battery packs that are selectively connected in parallel and operated at a first voltage level where N is an integer greater than 1. The N battery packs can also be selectively connected in series and operated at a second voltage level that is greater than the first voltage level. A power control system can be used to switch between the two or more voltage levels during driving depending upon the operating conditions of the EV.

The efficiency of the electric vehicle can be improved by selecting the most efficient voltage level for the operating conditions. In some examples, the operating conditions that are used to select the desired voltage level include operating configuration (motoring or regeneration), torque and speed, although other operating conditions can be used.

For example, the efficiency of an electric drive can be improved by operating at the minimum allowable voltage for the operating conditions. Higher voltage levels unlock performance and increase efficiency at certain operating points that cannot otherwise be achieved.

The power control system according to the present disclosure reconfigures N battery packs of the battery system to operate at N different voltage levels during driving. For example when N=2, the battery packs are connected in parallel to supply a first voltage level and connected in series to supply a second voltage level. In this example, the second voltage level is twice the first voltage level. While two battery packs and two voltage levels are used, additional battery packs and voltage levels can be used.

The power control system facilitates the switch reconfiguration of the battery system during operation of the vehicle between the N different voltage levels. During the transition, the power control system causes the electric machine to selectively generates a positive torque transient or a negative torque transient depending upon operating conditions. After supplying the torque transient, the power control system disconnects the N battery packs to avoid shorting battery terminals and to account for finite switching time. Then, the power control system reconnects the N battery packs in the desired configuration.

The power control system performs battery reconfiguration, switches with deadtime, and eliminates capacitor in-rush current using motor control. For example when motoring and transitioning from a lower voltage level to a higher voltage level, the negative torque transient charges the capacitor at the input of the power inverter. Reconfiguration is performed at zero current which protects the contactors and batteries for short circuit faults. In some examples, the power control system performs hysteretic control when selecting the desired configuration for operation.

Figure 1:
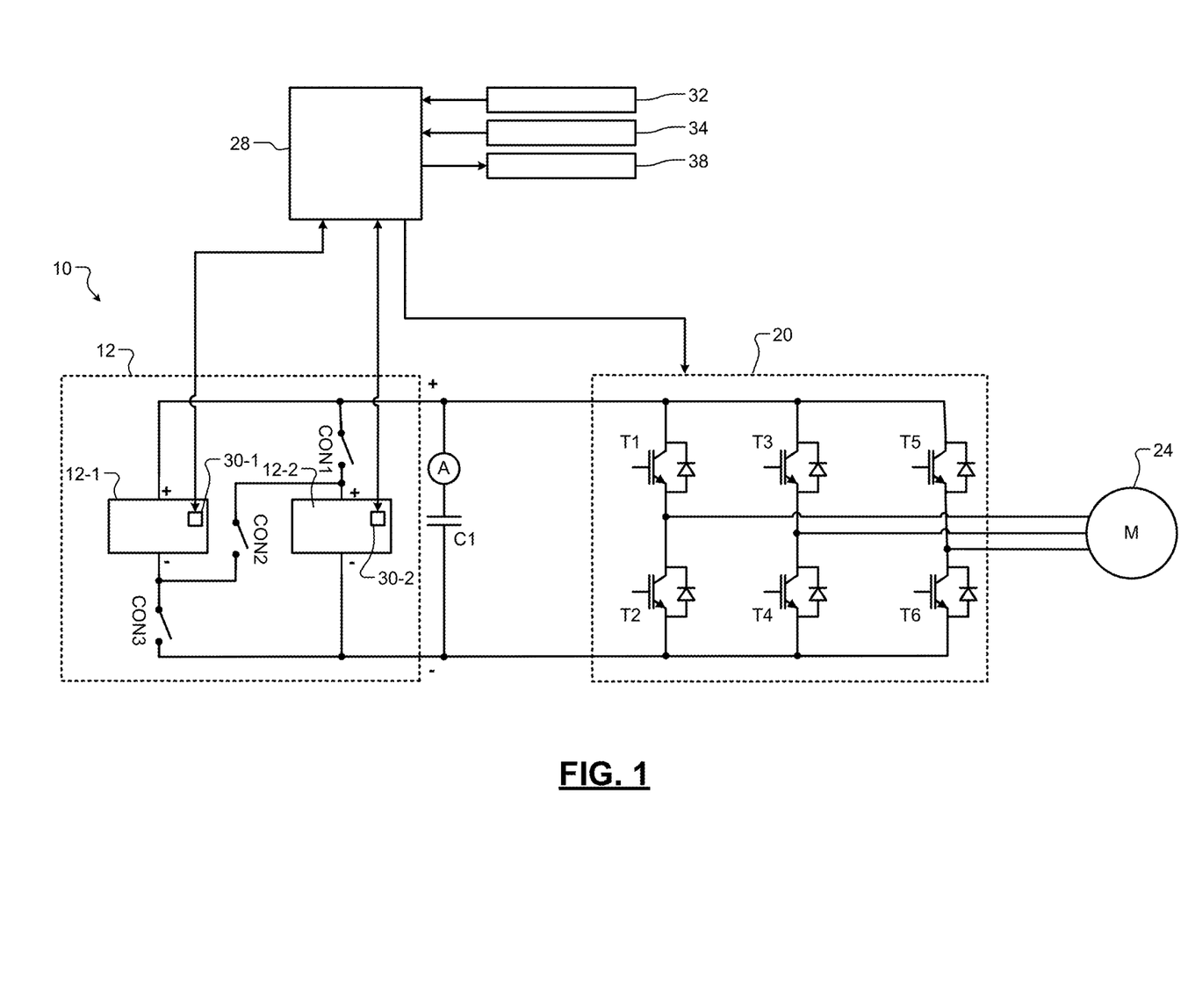
FIG. 1 is a functional block diagram of an example of a power control system for a battery system including two or more battery packs supplying power to an electric machine according to the present disclosure.

Referring now to FIG. 1, an example of a power control system 10 for a battery system 12 is shown. In this example, the battery system 12 includes a first battery pack 12-1 and a second battery pack 12-2. While two battery packs are shown, additional battery packs can be used. The first and second battery packs 12-1 and 12-2 of the battery system 12 are selectively connected by contactors to a capacitor C1 and a power inverter 20. While first, second and third power switches or contactors CON1, CON2, and CON3 are shown in a particular circuit arrangement, the number and arrangement of the contactors can be changed for a particular application.

The power control system 10 according to the present disclosure selectively reconfigures the battery packs 12-1 and 12-2 of the battery system 12 to operate in a first configuration, a disconnected configuration or a second configuration during driving. When operated in the first configuration, the battery packs 12-1 and 12-2 are connected by the contactors in parallel to output at a first voltage level. When operated in the disconnected configuration, the battery packs 12-1 and 12-1 are disconnected using the contactors. When operated in the second configuration, the battery packs 12-1 and 12-1 are connected by the contactors in series to output at a second voltage level which is double the first level.

In some examples, the first contactor CON1 includes a first terminal connected to the positive terminal of the battery system 12 and a second terminal connected to a positive terminal of the second battery pack 12-2. The second contactor CON2 includes a first terminal connected to a negative terminal of the battery pack 12-1 and a second terminal connected to a positive terminal of the second battery pack 12-2. A third contactor CON3 includes a first terminal connected to a negative terminal of the first battery pack 12-1 and a second terminal connected to a negative terminal of the battery system 12.

The power inverter 20 includes a plurality of power switches T1, T2, T3, T4, T5 and T6. First terminals of the power switches T1, T3 and T5 are connected to a positive terminal of the battery system 12. Second terminals of the power switches T1, T3 and T5 are connected to first terminals of the power switches T2, T4 and T6 and first, second and third phases of an electric machine 24. Second terminals of the power switches T2, T4 and T6 are connected to a second terminal of the battery system 12.

The power control system 10 further includes a controller 28 that communicates with battery pack controllers 30-1 and 30-2 for the first battery pack 12-1 and the second battery pack 12-2, respectively. The battery pack controllers 30-1 and 30-2 monitor various operating parameters of the first and second battery packs 12-1 and 12-2 such as temperature, voltage, current, etc. The operating parameters can be monitored at the battery pack level, the battery module level and/or the battery cell level. The controller 28 further communicates with sensors 34 and contactors 38 (including CON1, CON2 and CON3). The controller 28 receives input from a driver demand module 32 such as a throttle, a cruise control system, an autonomous driving module or other input.

Figure 2A:
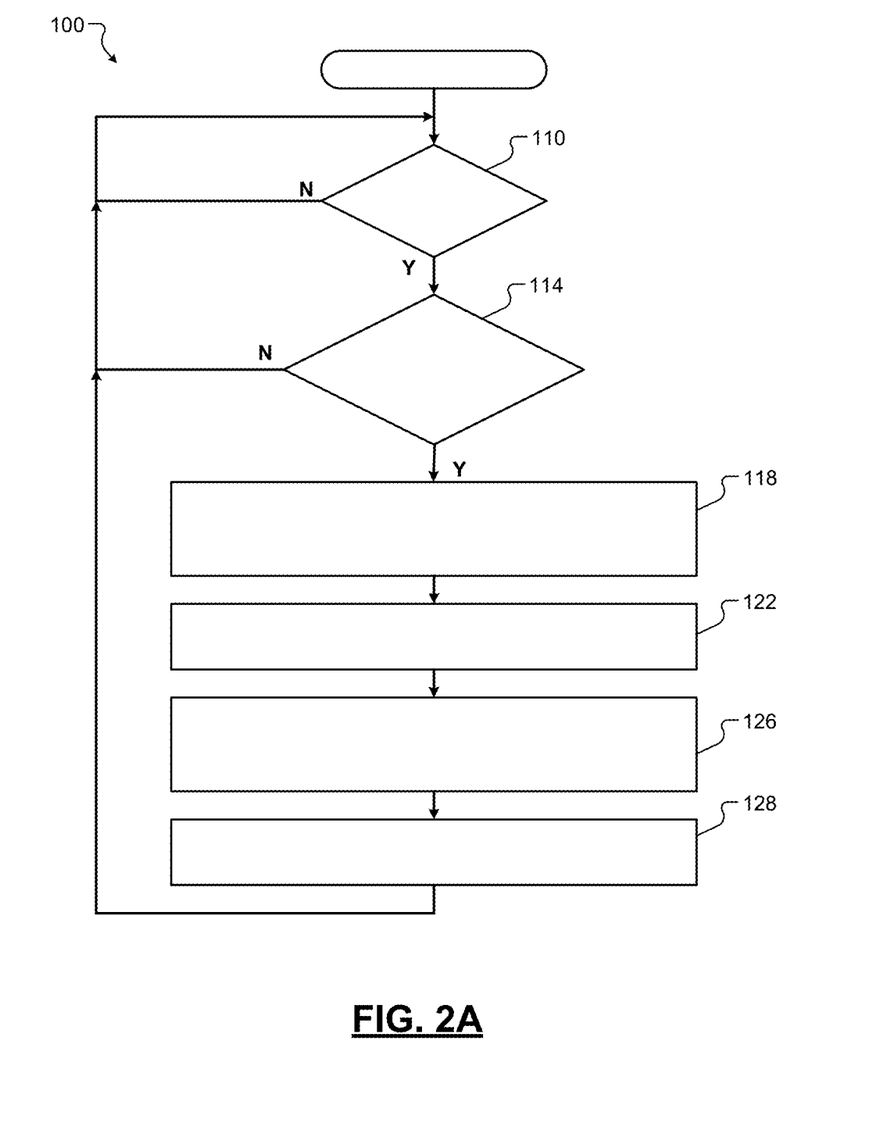
FIGS. 2A and 2B are flowcharts of examples of methods for operating the power control system during transitions between first and second voltages during motoring according to the present disclosure.

Referring now to FIG. 2A, a method 100 for controlling the battery system 12 is shown. At 110, the method determines whether the vehicle is operating. At 114, the method determines whether a transition from a first voltage level or V1 to a second voltage level or V2 during motoring is desired. In some examples, the method also determines if the speed is above a predetermined speed threshold prior to enabling with the transition. In some examples, the predetermined speed threshold is 5000 rpm, although other speed thresholds can be used.

At 118, the method sends a negative torque command to the motor for a first predetermined period while the contactors are still in the first configuration. In some examples, the negative torque transient is in a range from 1 to 50 Nm, although other torque values can be used. At 122, the contactors are opened for a second predetermined period to fully disconnect the battery system with the negative torque command still applied. At 126, after the second predetermined period, the contactors are reconfigured in the second configuration and original torque requested by driver is reinstated. At 128, the battery system is operated at V2 and control returns to 110.

Figure 2B:
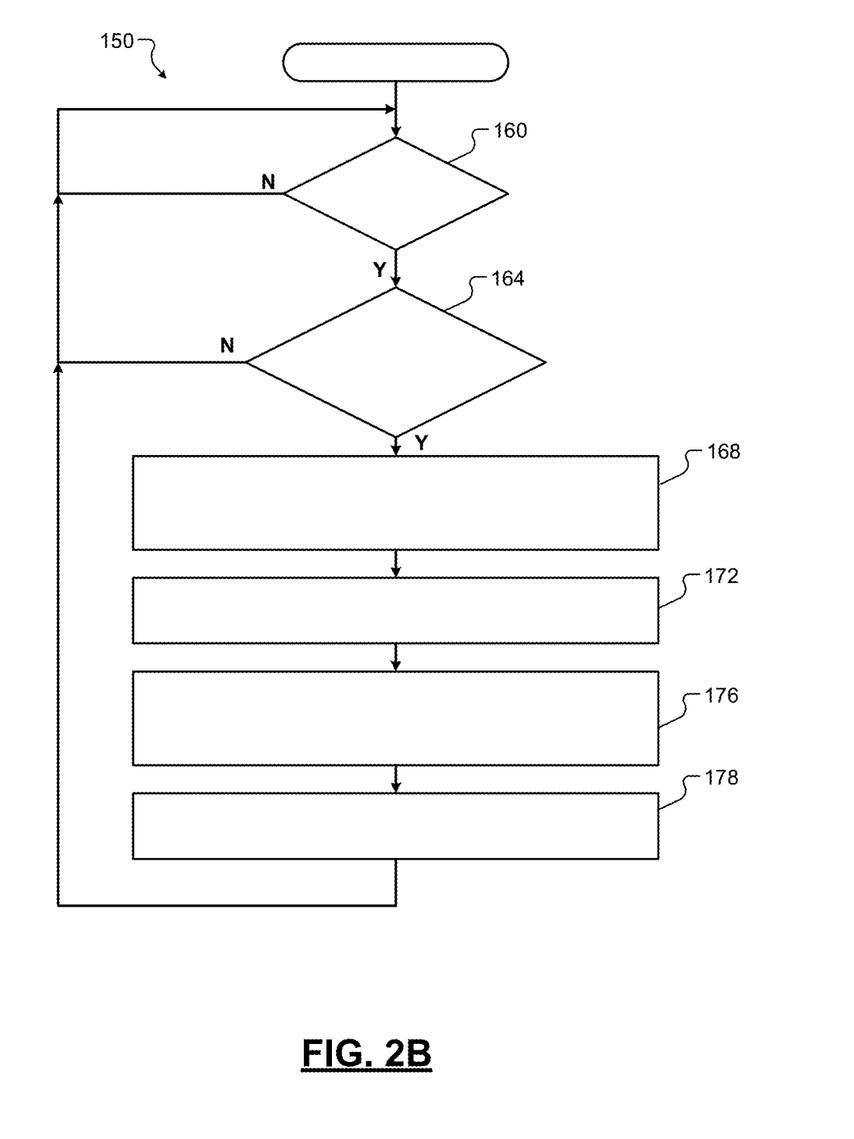

Referring now to FIG. 2B, a method 150 for controlling the battery system 12 is shown. At 160, the method determines whether the vehicle is operating. At 164, the method determines whether a transition from the second voltage level V2 to the first voltage level V1 during regeneration is desired. In some examples, the method also determines if the speed is below a predetermined speed threshold prior to proceeding. In some examples, the predetermined speed threshold is 5000 rpm, although other speed thresholds can be used.

At 168, the method sends a positive torque command to the electric machine for a first predetermined period while the contactors are still in the second configuration. At 172, the contactors are opened for a second predetermined period to fully disconnect the battery system with positive torque command still applied. The positive torque is typically 1 to 50 Nm but other values are possible. At 176, after the second predetermined period, the contactors are reconfigured in the first configuration to supply V1 and torque command from driver is reinstated. At 178, the battery system is operated at V1 and control returns to 160.

Figure 3A:
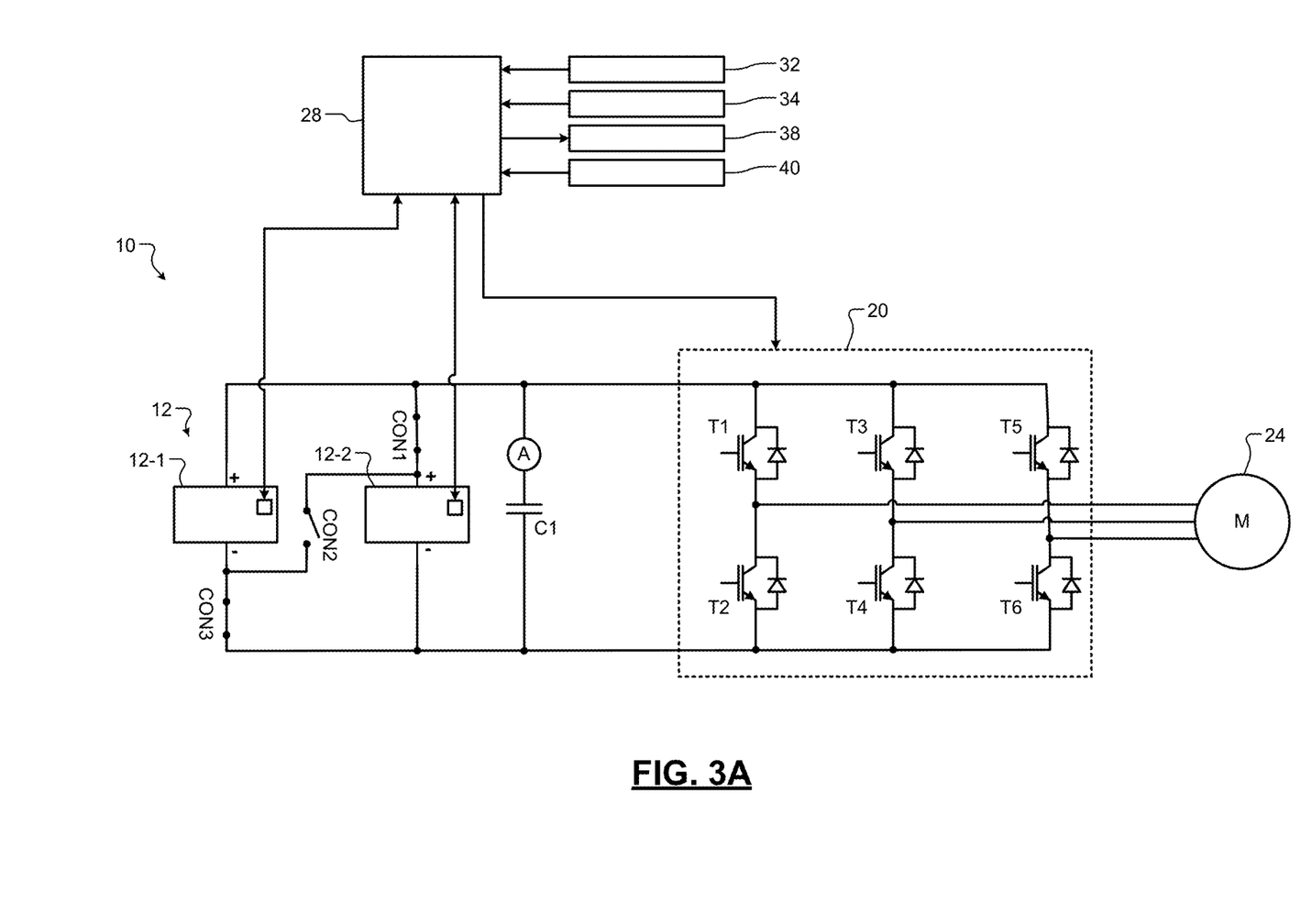
FIGS. 3A and 3B are a functional block diagrams of an example of the battery system configured in parallel and series, respectively, according to the present disclosure.
Figure 3B:
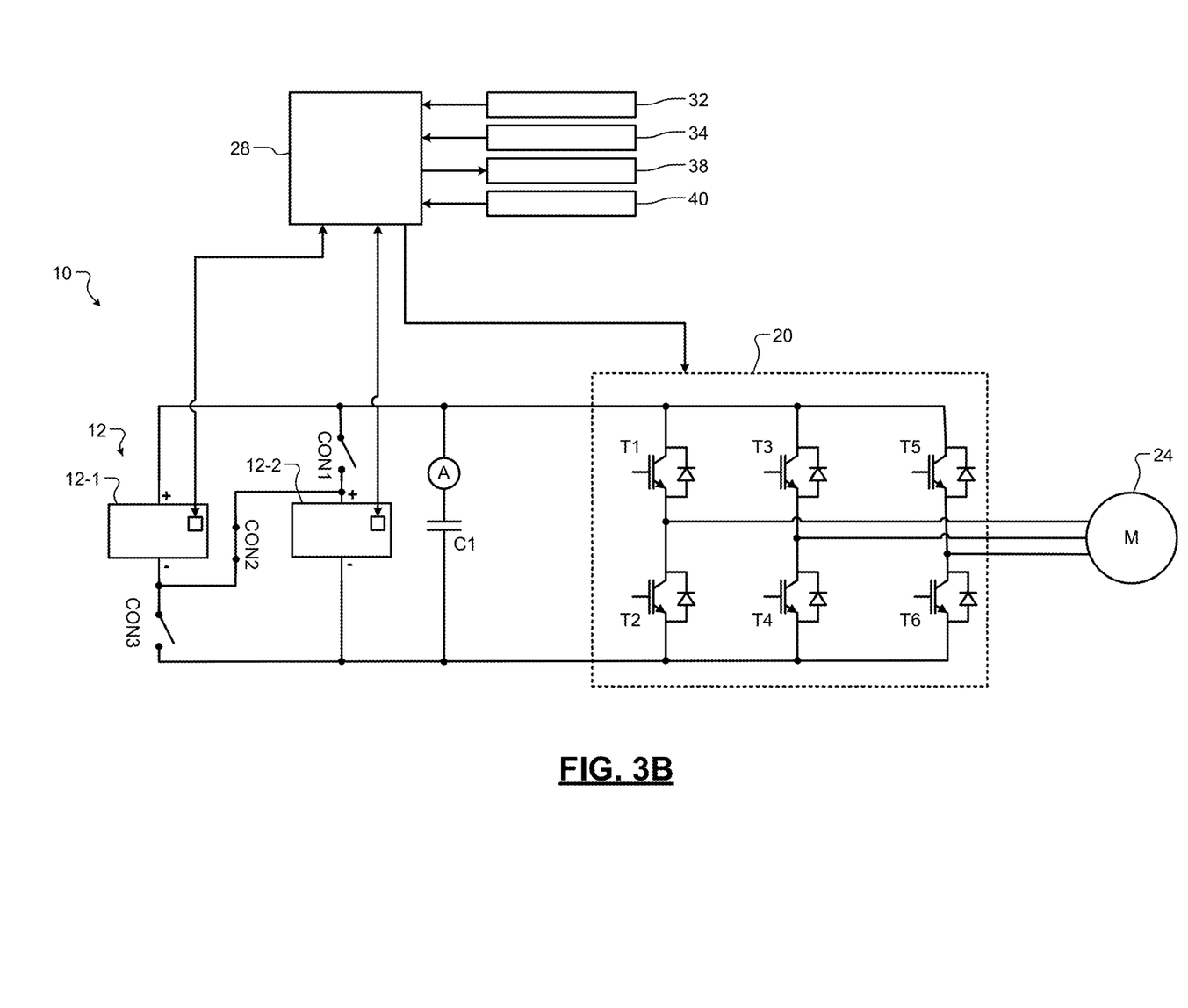

Referring now to FIGS. 1, 3A and 3B, the contactors are shown configured in the disconnected configuration (FIG. 1), the first configuration (FIG. 3A) and the second configuration (FIG. 3B), respectively. In FIG. 3A, the first contactor CON1 and the third contactor CON3 are closed and the second contactor CON2 is open. When transitioning from the first configuration to the second configuration, the contactors are opened to fully disconnect the first battery pack and the second battery pack as shown in FIG. 1. In FIG. 3B, the first contactor CON1 and the third contactor CON3 are open and the second contactor CON2 is closed for operation in the second configuration.

Figure 4A:
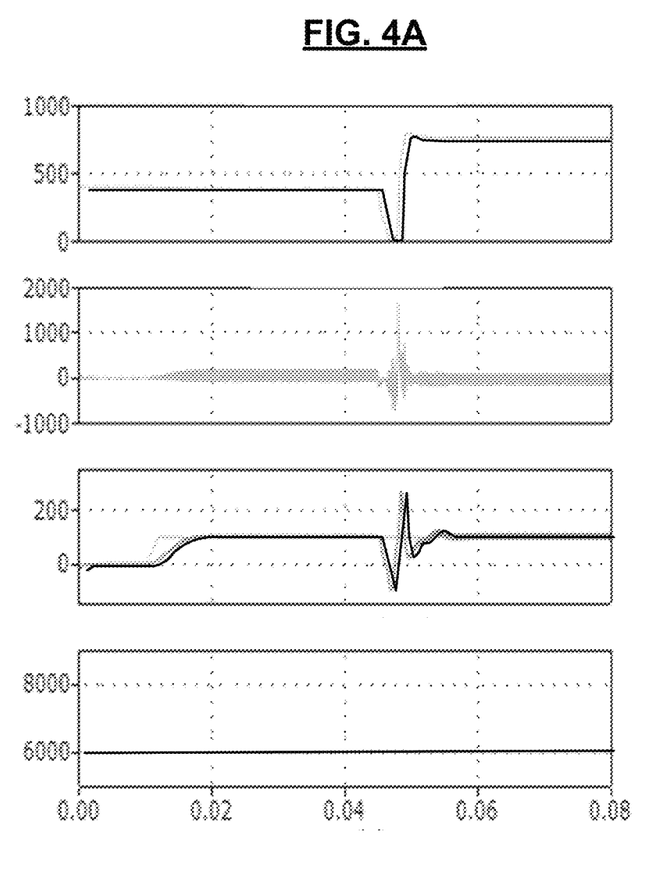
FIG. 4A includes graphs illustrating voltage, current, torque and speed for a power control system.
Figure 4B:
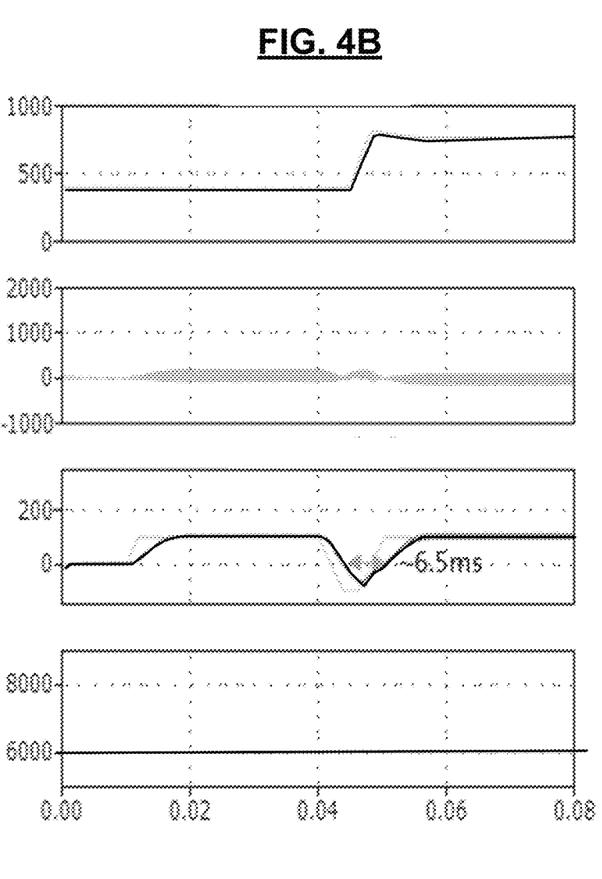
FIG. 4B are graphs illustrating voltage, current, torque and speed for a power control system according to the present disclosure.
Figure 4C:
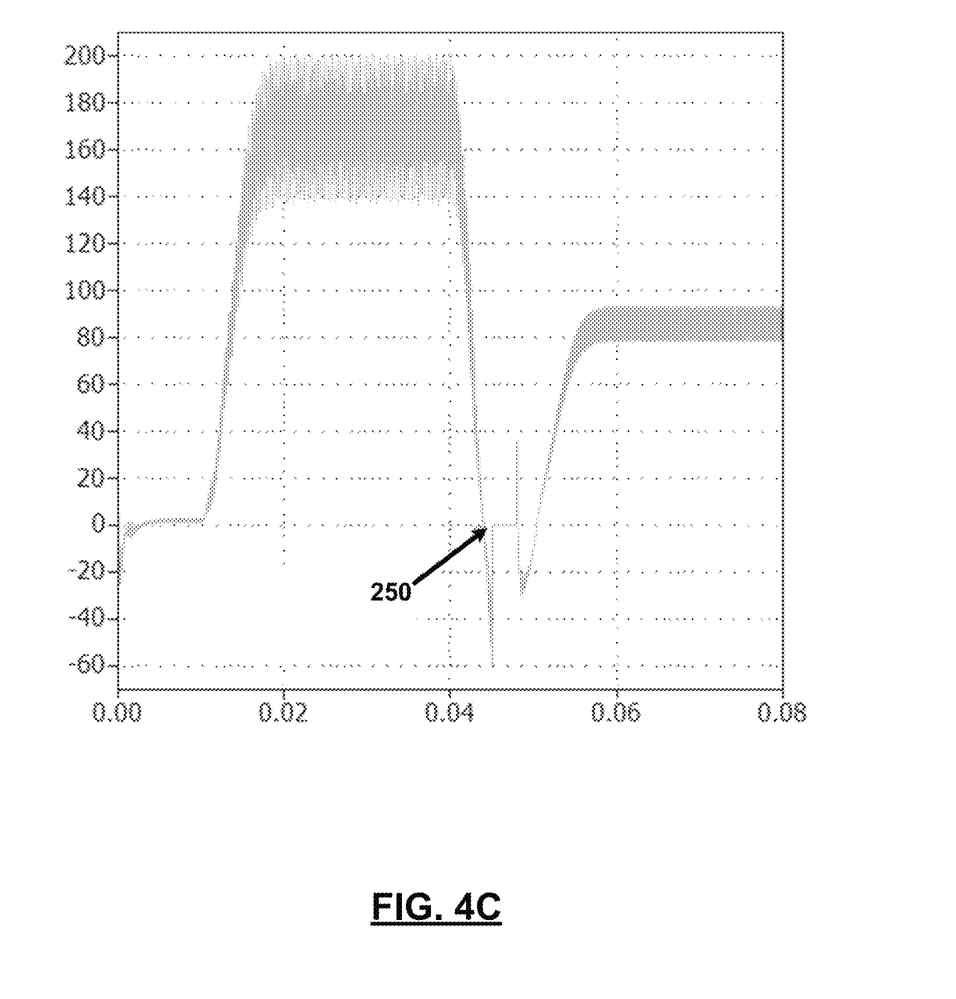
FIG. 4C is a graph illustrating DC battery current as a function of time during switching from a second voltage to a first voltage.

Referring now to FIGS. 4A to 4C, graphs illustrate a transition from the first configuration to the second configuration for systems that do not use torque transients (FIG. 4A) and for systems using torque transients according to the present disclosure (FIG. 4B). In FIG. 4A, the power control system transitions from the first configuration to fully disconnected and then from fully disconnected to the second configuration without commanding the negative torque transient. As can be seen, voltage flowing through the capacitor C1 drops during the fully disconnected period and then rises quickly as the contactors are configured in the second configuration. Current flowing through the capacitor C1 experiences large transients and then settles. The torque falls, overshoots, undershoots and then settles.

In FIG. 4B, the power control system commands the negative torque transient, transitions from the first configuration to the disconnected configuration, and then transitions from the disconnected configuration to the second configuration. As can be seen, voltage flowing through the capacitor C1 rises due to the negative torque transient during the disconnected period and then settles at the voltage level of the second configuration. Current flowing through the capacitor C1 experiences very small transients. The torque falls during the negative torque command and then rises and settles.

Fast motor current control systems can be used to gain further control over the duration of disconnected configuration and value of positive or negative torque transients. Typically disconnection and torque impulse duration are less than 10 ms.

In FIG. 4C, the DC battery current is shown as a function of time during a transition. Due to the torque transient generated immediately preceding the switch to another voltage level, current decreases significantly (approximately zero) prior to the dead time and reconnecting the switches, which reduces stress on the switches.

Figure 5:
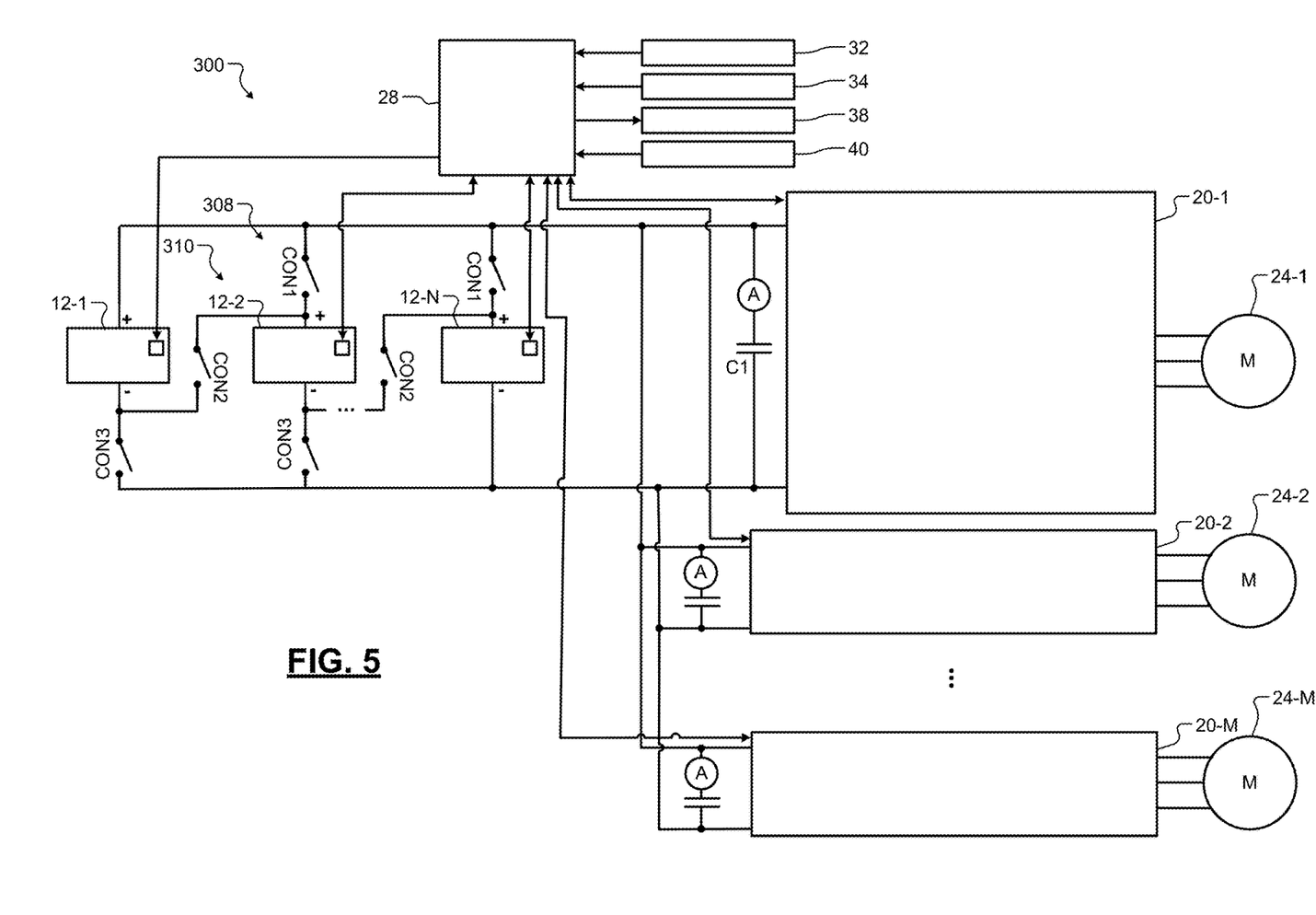
FIG. 5 is a functional block diagram of an example of a power control system for a battery system including two or more battery packs supplying power to two or more motors according to the present disclosure.

Referring now to FIG. 5, a power control system 300 for a propulsion system including a battery system 308 including N battery packs 12-1, 12-2, . . . and 12-N. The N battery packs 12-1, 12-2, . . . and 12-N supply power to M power inverters 20-1, 20-2 and 20-M (collectively power inverter(s) 20) and M electric machines 24-1, 24-2, . . . , and 24-M is shown (where M and N are integers that are greater than one) (collectively electric machine(s) 24). The battery packs of the battery system 12 are selectively connected by (N−1) sets of contactors 310 in series, parallel or disconnected configurations. When configured in series or parallel, the battery system 12 supplies power to the M inverters 20-1, 20-2 and 20-M and the M electric machines 24-1, 24-2, . . . , and 24-M. In some examples, the contactors 310 include CON1, CON2 and CON3 configured as described above or another configuration. In the example in FIG. 5, N is equal to 2 or 3 and M is equal to 3, although other values can be used.

As can be appreciated, when switching the battery system from one voltage level to a higher voltage level during motoring, one or more of the M electric machines 24 can be used to generate the negative torque transient. In some examples, one of the M electric machines is used to generate the negative torque transient. The motor that generates the negative torque transient does not need to be the motor providing motoring propulsion. In other examples, 2 to M−1 of the motors are used to generate the torque transient. In still other examples, all of the M electric machines are used to generate the torque transient.

As can be appreciated, when switching the battery system from one voltage level to a lower voltage level during regeneration, one or more of the M electric machines 24 can be used to generate the positive torque transient. In some examples, one of the M electric machines is used to generate the positive torque transient. The electric machine generating the positive torque transient need not be the same motor providing that is regenerating. In other examples, 2 to M−1 of the motors are used to generate the torque transient. In still other examples, all of the M electric machines are used to generate the torque transient.

Figure 6:
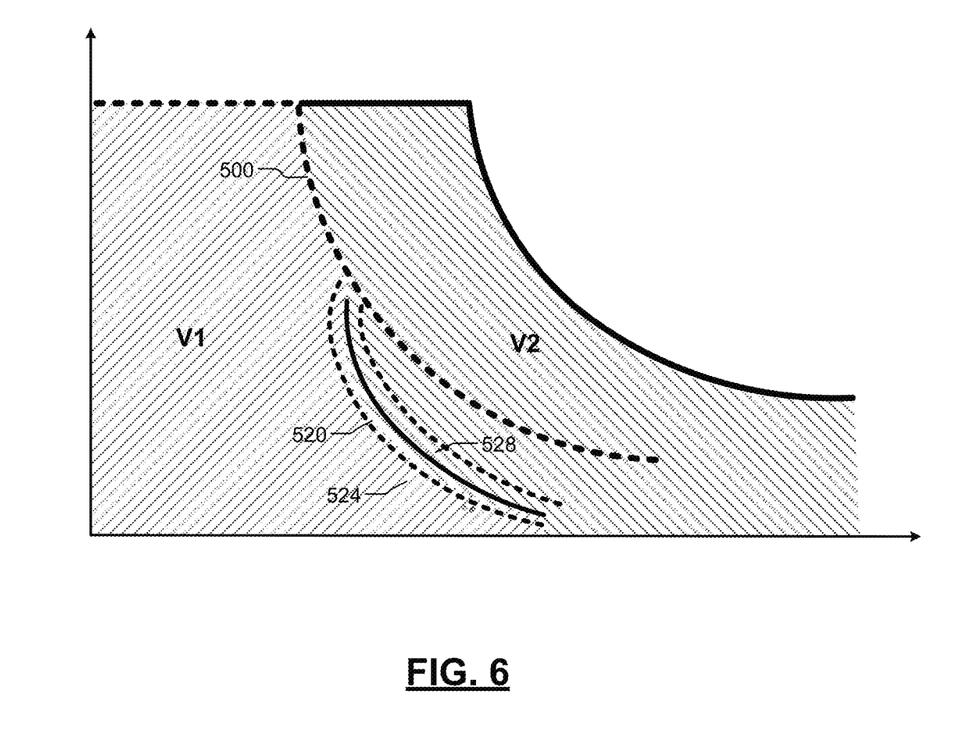
FIG. 6 is a graph illustrating a configuration transition line as a function of torque and speed according to the present disclosure.

Referring now to FIG. 6, hysteretic control or hysteresis can be used to determine when to transition from one voltage level to another. A voltage transition line 500 shows a physical constraint threshold for transitioning between V1 and V2. In some examples, V1 is equal to 400V and V2 is equal to 800V. Additional efficiency and/or performance can be achieved by using a modified transition line 520 for some operating conditions. When determining whether to transition between the voltage levels, hysteretic control can be used. In other words, the decision to transition from V1 to V2 occurs when torque and speed values are above a transition line 528 (rather than the transition line 520). The decision to transition from V2 to V1 occurs when torque and speed values are below a transition line 524 (rather than the transition line 520). The use of hysteretic control prevents hunting (repeated switching back and forth between the voltage levels) when the torque and speed values are near the transition line 520.

With live route information and autonomous driving, route planning and traffic conditions can be used to preplan the vehicle operating conditions and switching from V1 to V2 and back.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A power control system comprising:
 a battery system including N battery packs, where N is an integer greater than one;
 a plurality of contactors selectively connecting N battery packs of a battery system in a first configuration supplying a first voltage level, a second configuration supplying a second voltage level, and a disconnected configuration;
 M power inverters connecting the battery system to M electric machines, respectively, where M is an integer greater than zero; and
 a controller configured to:
  determine when to transition between the first configuration and the second configuration; and
  transition between the first configuration and the second configuration by:
   causing one of a positive torque transient and a negative torque transient to be generated by at least one of the M electric machines;
   transitioning the battery system from one of the first configuration and the second configuration to the disconnected configuration; and
   transitioning from the disconnected configuration to the other one of the first configuration and the second configuration.

2. The power control system of claim 1, wherein:
 the N battery packs are connected in parallel in the first configuration; and
 the N battery packs are connected in series in the second configuration.

3. The power control system of claim 1, wherein the plurality of contactors comprises:
 a first contactor including a first terminal connected to a positive terminal of the battery system and a second terminal connected to a positive terminal of a second one of the N battery packs;
 a second contactor including a first terminal connected to the positive terminal of the second one of the N battery packs and a second terminal connected to a negative terminal of a first one of the N battery packs; and
 a third contactor including a first terminal connected to the negative terminal of the first one of the N battery packs and a second terminal connected to a negative terminal of the battery system.

4. The power control system of claim 3, wherein:
 the first contactor and the third contactor are closed and the second contactor is open when the battery system is in the first configuration; and the first contactor and the third contactor are open and the second contactor is closed when the battery system is in the second configuration.

5. The power control system of claim 1, wherein when transitioning from the first configuration to the second configuration when operating in a motoring configuration above a predetermined speed threshold, the controller is configured to cause the negative torque transient to be generated by at least one of the M electric machines.

6. The power control system of claim 5, when transitioning from the second configuration to the first configuration when operating in a regeneration configuration below a predetermined speed threshold, the controller is configured to cause the positive torque transient to be generated by at least one of the M electric machines.

7. The power control system of claim 1, wherein the controller determines when to transition between the first configuration and the second configuration in response to torque and speed of at least one of the M electric machines.

8. The power control system of claim 7, wherein the controller uses hysteresis when determining when to transition between the first configuration and the second configuration.

9. The power control system of claim 1, wherein when transitioning from the first configuration to the second configuration when operating one of the M electric machines in a motoring configuration above a predetermined speed threshold, the controller is configured to cause the negative torque transient to be generated at least partially by another one of the M electric machines.

10. The power control system of claim 1, wherein when transitioning from the second configuration to the first configuration when operating one of the M electric machines in a regeneration configuration below a predetermined speed threshold, the controller is configured to cause the positive torque transient to be generated by another one of the M electric machines.

11. A method for controlling power delivery in an electric vehicle, comprising:
providing a battery system including N battery packs, where N is an integer greater than one;
selectively connecting N battery packs of a battery system in a first configuration supplying a first voltage level, a second configuration supplying a second voltage level, and a disconnected configuration using a plurality of contactors;
connecting the battery system to M electric machines using M power inverters, respectively, where M is an integer greater than zero; and
determining when to transition between the first configuration and the second configuration; and
transitioning between the first configuration and the second configuration by:
causing one of a positive torque transient and a negative torque transient to be generated by at least one of the M electric machines;
transitioning the battery system from one of the first configuration and the second configuration to the disconnected configuration; and
transitioning from the disconnected configuration to the other one of the first configuration and the second configuration.

12. The method of claim 11, wherein:
connecting the N battery packs in parallel in the first configuration; and
connecting the N battery packs in series in the second configuration.

13. The method of claim 11, wherein the plurality of contactors comprises:
a first contactor including a first terminal connected to a positive terminal of the battery system and a second terminal connected to a positive terminal of a second one of the N battery packs;
a second contactor including a first terminal connected to the positive terminal of the second one of the N battery packs and a second terminal connected to a negative terminal of a first one of the N battery packs; and
a third contactor including a first terminal connected to the negative terminal of the first one of the N battery packs and a second terminal connected to a negative terminal of the battery system.

14. The method of claim 13, further comprising:
closing the first contactor and the third contactor and opening the second contactor when the battery system is in the first configuration; and
opening the first contactor and the third contactor and closing the second contactor when the battery system is in the second configuration.

15. The method of claim 11, further comprising causing the negative torque transient to be generated by at least one of the M electric machines when transitioning from the first configuration to the second configuration when operating in a motoring configuration above a predetermined speed threshold.

16. The method of claim 15, further comprising causing the positive torque transient to be generated by at least one of the M electric machines when transitioning from the second configuration to the first configuration when operating in a regeneration configuration below a predetermined speed threshold.

17. The method of claim 11, further comprising determining when to transition between the first configuration and the second configuration in response to torque and speed of at least one of the M electric machines.

18. The method of claim 17, further comprising using hysteresis when determining when to transition between the first configuration and the second configuration.

19. The method of claim 11, further comprising causing the negative torque transient to be generated at least partially by one of the M electric machines when transitioning from the first configuration to the second configuration when operating another one of the M electric machines in a motoring configuration above a predetermined speed threshold.

20. The method of claim 11, further comprising causing the positive torque transient to be generated by another one of the M electric machines when transitioning from the second configuration to the first configuration when operating one of the M electric machines in a regeneration configuration below a predetermined speed threshold.

* * * * *